United States Patent [19] [11] 4,140,494
Coes, Jr. [45] Feb. 20, 1979

[54] METHOD FOR RAPID COOLING MOLTEN ALUMINA ABRASIVES

[75] Inventor: Loring Coes, Jr., Princeton, Mass.

[73] Assignee: Norton Company, Worcester, Mass.

[21] Appl. No.: 844,221

[22] Filed: Oct. 21, 1977

[51] Int. Cl.² .................... C04B 31/16; B24D 3/04
[52] U.S. Cl. ........................................ 51/309; 264/8; 264/14; 264/298
[58] Field of Search ............... 51/309; 264/8, 14, 212, 264/214, 215, 298, 4

[56] References Cited
U.S. PATENT DOCUMENTS

| | | |
|---|---|---|
| 3,660,544 | 5/1972 | Young et al. .......................... 264/8 |
| 3,928,515 | 12/1975 | Richmond ............................. 264/8 |
| 4,059,417 | 11/1977 | Ilmaier et al. ......................... 51/309 |
| 4,063,942 | 12/1977 | Lundgren ............................. 264/8 |

Primary Examiner—Donald J. Arnold
Attorney, Agent, or Firm—Rufus M. Franklin

[57] ABSTRACT

Molten aluminous oxide abrasive, particularly molten mixtures of alumina and zirconia, are rapidly cooled and solidified by pouring into an agitated molten metal bath, having a boiling point above the temperature of said molten abrasive, such as molten tin, while being protected from oxidation. The solidified abrasive particles float to the top of the metal bath, are removed and separated from adhering metal, as by centrifuging, and crushed to abrasive grit-sized particles.

8 Claims, 1 Drawing Figure

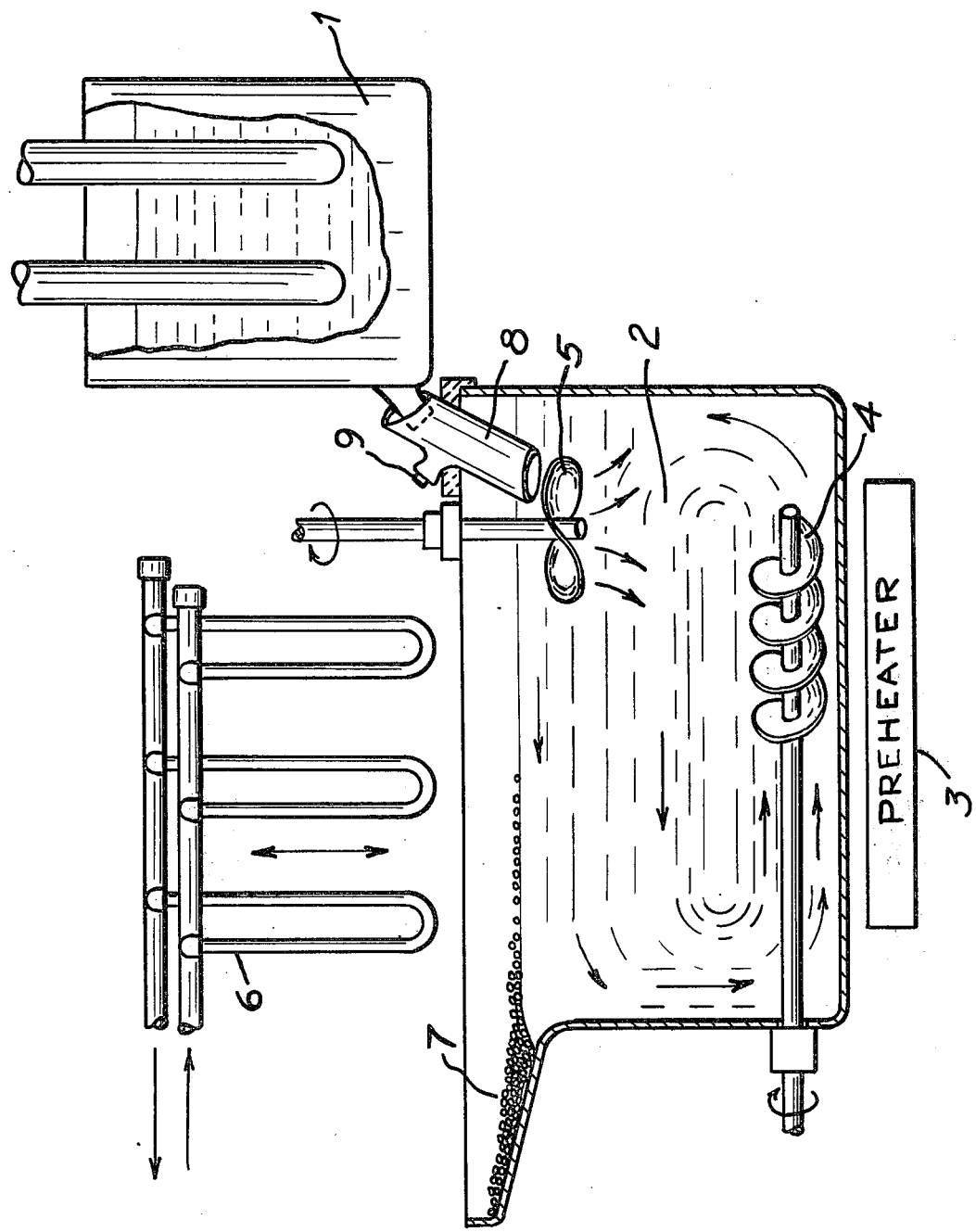

METHOD FOR RAPID COOLING MOLTEN ALUMINA ABRASIVES

FIELD OF THE INVENTION

The invention is a method and apparatus for rapidly quenching molten oxides for the production of abrasive grits.

BACKGROUND OF THE INVENTION

Various methods of cooling molten aluminous abrasive have been disclosed in the prior art, such as casting on product lumps (U.S. Pat. No. 3,781,172), casting on metal balls, casting between metal plates, and casting into molten salts (published German Application No. 2,519,569). For reasons pointed out below, the first three named methods are not entirely satisfactory. The last named method suffers from the low thermal conductivity, specific gravity, and boiling point of the proposed fused salts.

BRIEF DESCRIPTION OF THE DRAWING

The drawing shows a schematic and partly sectional view of an apparatus containing molten metal, into which the molten abrasive is poured to rapidly cool it. Also shown is the arc furnace from which the abrasive is poured, and accessory apparatus.

BRIEF DESCRIPTION OF THE INVENTION

Zirconia-alumina abrasives are well known and described in U.S. Pat. No. 3,181,939 to Marshall and Roschuk and 3,891,408 to Rowse and Watson. In general they consist of a eutectic structure of about 42% $ZrO_2$ and 58% $Al_2O_3$ plus primary crystals of an aluminum oxide or primary crystals of monoclinic, or tetragonal, zirconium oxide. In addition to these constituents there are present, because of the method of manufacture, various reduction products. These comprise oxygen deficient zirconium oxides, zirconium carbide, metallic zirconium, and various other compounds derived from the impurities in the raw materials.

The value of these abrasives in grinding operations has been repeatedly shown to be dependant on the rate of quenching from the fused mixture, and on its subsequent thermal history in the presence of oxygen or water. The following facts stand out:

1. The most rapid quenching rate produces the best abrasive.
2. The best abrasives are most susceptible to deterioration by oxygen attack at high temperatures.
3. The oxygen attack can occur either during the preparation of the abrasive itself, or during the bonding of it into useful products.

The present commercial methods of preparing these abrasives consist of pouring the fused mixture into molds, of various configurations, designed to give the maximum cooling rate.

These methods, now in use, suffer from two drawbacks. These are:

1. The fused material is exposed to air and/or water vapor during the solidification process. This produces a considerable amount of bleached, or light colored material which is inferior for abrasive purposes. The best abrasives of this type are black because of the presence of reduced oxides, carbides or zirconium metal.
2. The cooling rate is considerably less than expected for two reasons. These are:
    a. The solid mold surfaces against which the fused material is cast becomes coated with oxide and the thermal conductivity is much less than expected.
    b. The fused material, immediately after casting, shrinks and loses contact with the mold surface and the rate of heat removal is drastically reduced. This is evidenced by the characteristically wavy and pock marked surface of the cast product.

What is needed is a more rapid cooling rate in the complete absence of air or water vapor.

The present invention achieves this by casting into a molten metal. This can be done by pouring directly from the furnace through a funnel blanketed with an inert gas, such as argon, into an agitated bath of a low melting metal, such as tin, which has a boiling point substantially greater than the fused mixture of zirconium and aluminum oxides.

The melt temperature of the fused oxides is typically between about 1870° C. to 1950° C. Tin, which melts at 232° C. and boils at 2270° C., is exactly suited for this purpose. The density of the molten tin is 6.37, so that the abrasive, which has a density usually between 4.0 and 5.0 after solidification, will rise slowly to the surface and can be skimmed off.

The cooling rate in the molten bath is more rapid than with the same melt in contact with a cold steel surface because of the higher heat transfer coefficient. That is there is no impedance of heat flow by the presence of oxide films on the steel or by lack of perfect contact.

It is necessary only to cool the oxide melt as rapidly as possible to a temperature below about 900° C. This can be accomplished best, under nonoxidizing conditions, by pouring the melt into a bath of molten tin.

By this process perfect contact between the cooling bath of tin and the fused abrasive is maintained until the abrasive is well below the critical temperature.

It is advantageous in the pouring process to have the tin bath agitated so that the molten abrasive stream is comminuted and the abrasive solidifies in spherical or irregular particles. The particle size can be controlled by the intensity of agitation. The solidified particles float to the surface and can be skimmed off. Any adhering tin can be removed by a subsequent centrifuge operation at a temperature above 235° C.

The irregular particles are then crushed and screened in the usual manner to provide the desired grain sizes.

DETAILED DESCRIPTION OF THE INVENTION

The equipment for carrying out the above procedure is shown in FIG. 1. In this is shown a conventional arc fusion furnace 1 in which the oxide or mixture of oxides are fused. The fused material is then poured into a bath of molten tin 2. This is preferably done through a tube 8 which is kept filled with an inert gas, such as argon, introduced through inlet 9.

Before the pouring of the abrasive the bath 2 is brought to slightly above the melting point of tin by means of a preheater 3 which may be gas or oil fired, or electrically heated. The bath is kept in circulation by means of the impellar 4 and kept in turbulence in the pouring area by the agitator 5. The speed of the agitator 5 is adjusted to give the required granularity to the product.

Once pouring has begun the bath temperature begins to rise because of the latent heat of the fused oxides. The bath temperature is controlled to somewhat above 235° C. by means of the lowerable water cooled coils 6.

The product floats to the surface, at a temperature below that which oxygen can produce any deterioration, and collects in the area 7 from which it can readily be skimmed off.

Any adhering tin can be removed by centrifuging the product at a temperature above about 235° C.

Other metals for casting ZA abrasives:

Of all the elements, tin holds a unique position in this field. Its important properties are:

MP: 232° C.
BP: 2270° C.
Sp.G (liq.): 6.28 (gm/cc)
Thermal Conductivity (liq.): 0.078 Cal/Sec/cm$^2$/° C./cm The only two other possibilities are:

1. Gallium
   MP: 29.8° C.
   BP: 1983° C.
   Sp.G: 5.91 gm/cc

This has several drawbacks. It is very expensive, it is highly corrosive, and reacts with aluminum oxide.

2. Indium
   MP 156.4° C.
   BP 2000° C.
   Sp.G 7.28 gm/cc

The drawbacks here are that: 1. The metal is very expensive. 2. It belongs to the aluminum group of metals and some reaction with the molten abrasive would be expected though no studies have reported on this.

Thus, while the possibility of using gallium or indium should not be overlooked, tin seems to be the most practical material to employ, and thus tin or compositions consisting mainly of tin are preferred.

Mixtures of metals could be used but would have to be selected from the group Sn, Ga, In. There are serious drawbacks to use of Ga or In.

Lead is unsuitable since it boils at 1600° C. Zinc, which boils at 907° C. and cadmium which boils at 767° C., are also unsuitable.

While the invention has been described for use with zirconia-alumina alloy type abrasives, it also has utility in producing finely crystalline aluminum oxide and in producing other aluminous alloy type abrasives such as spinel-zirconia, as described in U.S. Pat. No. 2,498,769 to Coes.

What is claimed is:

1. A method of producing abrasive grain by quickly solidifying molten aluminous oxide abrasive compositions by casting the molten oxide, having a temperature between 1870° C. and 1950° C., into a bath of molten metal, said metal being molten below 300° C. and having a boiling point above 2000° C., and subsequently separating said abrasive in solid form from said metal and crushing it to abrasive grit sized particles.

2. A method as in claim 1 in which the molten metal consists essentially of tin.

3. A method as in claim 2 in which the abrasive is a mixture of fused aluminum oxide and zirconium oxide.

4. A method as in claim 1 in which the molten metal is mechanically stirred while the abrasive is poured into it.

5. A method as in claim 4 in which the molten metal is cooled by heat exchange means.

6. A method as in claim 1 in which the abrasive is withdrawn in the form of discreet particles from the metal bath and is centrifuged, while hot, to remove the metal therefrom.

7. A method as in claim 1 in which the molten abrasive is protected from contact with oxidizing gases while being poured into the bath.

8. A method as in claim 1 in which the abrasive is introduced into the bath by means of a tube, one end of which is submerged in the metal bath.

* * * * *